3,481,950
SUBSTITUTED (4 - OXO-2-OXAZOLIDINYLIDENE) UREA DERIVATIVES
Cheuk Man Lee, Waukegan, Ill., assignor to Abbott Laboratories, Chicago, Ill., a corporation of Illinois
No Drawing. Filed June 28, 1967, Ser. No. 649,481
Int. Cl. C07d 85/26
U.S. Cl. 260—307                 15 Claims

ABSTRACT OF THE DISCLOSURE

A novel series of 4-oxo-2-oxazolidinylidene urea derivatives which exhibit central nervous system activity by enhancing learning rate coupled with prolonging the period of memory retention.

DESCRIPTION OF INVENTION

This invention is directed to a novel series of chemical compounds of the general formula (I)

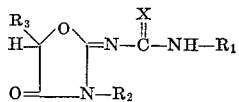

wherein X is a member selected from the group consisting of oxygen and sulfur; $R_1$ is a member selected from the group consisting of hydrogen, alkyl, alkenyl, cycloalkyl, phenyl, substituted phenyl, arylsulfonyl and alkoxycarbonylalkyl; $R_2$ is selected from the group consisting of hydrogen and alkyl; and $R_3$ is a member selected from the group consisting of phenyl and substituted phenyl.

Generally, these compounds are prepared from the compound 2-imino-3-methyl-5-phenyl-4-oxazolidinone, of the structural formula (II)

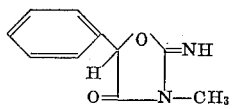

as the starting material. It is known that when a hydrogen atom appears at the 3-position as shown in Formula III, it is extremely mobile and therefore this compound (III) exists in several tautomeric forms. The two most common tautomeric structures may be represented as follows:

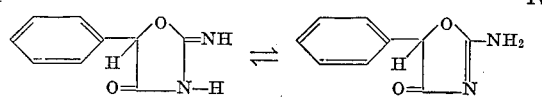

For ease of description, the compound referred to herein shall be named in accordance with Structure III, since this is the tautomeric form in which this compound is usually named and written. However, it is to be understood that the other tautomers may be similarly employed as starting materials to make the novel compounds of this invention.

These novel compounds are generally prepared by reacting, in a suitable solvent, 2-imino-3-methyl-5-phenyl-4-oxazolidinone with at least an equimolar proportion of an isocyanate of the formula $O\!=\!C\!=\!N\!-\!R_1$ wherein $R_1$ is as described previously. This reaction is also accomplished by reacting an alkali metal cyanate with an organic or inorganic acid and then with the 2-imino-3-methyl-5-phenyl-4-oxazolidinone. The reaction product of an alkali metal cyanate and an acid is cyanic acid having the structural formula $O\!=\!C\!=\!N\!-\!H$, which is the simplest isocyanate. This variation is conveniently used where it is desired to prepare the simplest (4-oxo-2-oxazolidinylidene)urea derivatives.

In order to better illustrate this invention, the following examples are presented demonstrating but a few specific embodiments.

EXAMPLE 1

1-methyl-3-(3-methyl-4-oxo-5-phenyl-2-oxazolidinylidene)urea

A mixture of 9.5 grams (0.05 mole) of 2-imino-3-methyl-5-phenyl-4-oxazolidinone, 22.8 grams (0.4 mole) of methyl isocyanate, and 50 ml. of pyridine is stirred and refluxed for 2 hours. The excess methyl isocyanate is then removed by distillation and the mixture poured over water. The crude product crystallizes out of solution. Recrystallization from ethanol yields 1-methyl-3-(3-methyl-4-oxo-5-phenyl-2-oxazolidinylidene)urea having a melting point of 196° C.

EXAMPLE 2

1-(3-methyl-4-oxo-5-phenyl-2-oxazolidinylidene)-3-phenylurea

To a solution of 5.7 grams (0.03 mole) of 2-imino-3-methyl-5-phenyl-4-oxazolidinone in 150 ml. of benzene is added 3.6 grams (0.03 mole) of phenyl isocyanate. The reaction mixture is stirred for one hour at room temperature followed by heating under reflux for 2 hours. The solvent is removed in vacuo leaving the crude product as a residue. Recrystallization from ethanol yields the product 1 - (3-methyl-4-oxo-5-phenyl-2-oxazolidinylidene)-3-phenylurea having a melting point of 178° C.

EXAMPLE 3

N-[(3-methyl-4-oxo-5-phenyl-2-oxazolidinylidene)carbamoyl]glycine ethyl ester

To a stirred solution of 5.7 grams (0.03 mole) of 2-imino-3-methyl-5-phenyl-4-oxazolidinone in 150 ml. of benzene is added 3.9 grams (0.03 mole) of ethyl isocyanatoacetate. The reaction mixture is stirred for 20 hours at room temperature and the solid residue filtered from the mixture. The filtrate is concentrated to yield more solid. The combined solids are recrystallized from ethanol yielding the product N-[(3-methyl-4-oxo-5-phenyl-2-oxazolidinylidene)carbamoyl]glycine ethyl ester having a melting point of 118° C.

EXAMPLE 4

(3-methyl-4-oxo-5-phenyl-2-oxazolidinylidene)urea

An aqueous solution of 3.2 grams (0.04 mole) of potassium cyanate in 6 ml. of water is added dropwise to a stirred solution of 1.9 grams (0.01 mole) of 2-imino-3-methyl-5-phenyl-4-oxazolidinone in a mixture of 7.5 ml. of acetic acid and 15 ml. of water. The reaction mixture is stirred for 1.5 hours at room temperature, diluted with 10 ml. of water and cooled in an ice bath. The solid is filtered and sublimed at a bath temperature of 100° C. and a pressure of 0.05 millimeter of mercury for 48 hours. The sublimed material is 3-methyl-5-phenyl-2,4-oxazolidinedione having a melting point of 112° C.; the unsublimed material is the desired product (3-methyl-4-oxo-5-phenyl-2-oxazolidinylidene)urea having a melting point of 175° C. after recrystallization from methanol.

EXAMPLE 5

1-methyl-3-(4-oxo-5-phenyl-2-oxazolidinylidene)urea

A mixture of 4.4 grams of 2-imino-5-phenyl-4-oxazolidinone, 20 ml. of methyl isocyanate and 60 ml. of pyridine is stirred and refluxed for 4 hours. The mixture is concentrated to about 15 ml. of distillation under reduced pressure and poured onto 100 ml. of water. A precipitate forms which is filtered and recrystallized from ethanol. The product is further purified by sublimation at a bath temperature of 110° C. and a pressure of 0.05 millimeter of mercury for 48 hours. The unsublimed material is recrystallized from ethanol yielding the product 1-methyl-3-(4-oxo-5-phenyl-2-oxazolidinylidene)urea having a melting point of 194° C.

EXAMPLE 6

1-ethyl-3-(3-methyl-4-oxo-5-phenyl-2-oxazolidinylidene)-2-thiourea

To a solution of 3.8 grams (0.02 mole) of 2-imino-3-methyl-5-phenyl-4-oxazolidinone in 20 ml. of pyridine is added 7.8 grams (0.09 mole) of ethyl isothiocyanate. The mixture is refluxed with stirring for 2.5 hours and evaporated in vacuo. The residue is dissolved in a small amount of hot ethanol and the solution refrigerated until crystallization occurs. The crude product is recrystallized from ethanol yielding 1-ethyl-3-(3-methyl-4-oxo-5-phenyl-2-oxazolidinylidene)-2-thiourea having a melting point of 97° C.

Following the procedures illustrated in the above examples, various other (4-oxo-2-oxazolidinylidene)urea derivatives may be prepared. In Table I below are listed several other such derivatives wherein reference is made to Formula I and X, $R_1$, $R_2$ and $R_3$ are defined as well as a physical constant, e.g., melting point, identifying the compound.

TABLE 1

| Example: | X | $R_1$ | $R_2$ | $R_3$ | M.P. in °C. |
|---|---|---|---|---|---|
| 7 | 0 | $C_2H_5$ | $CH_3$ | $C_6H_5$ | 194 |
| 8 | 0 | $C_3H_7$ | $CH_3$ | $C_6H_5$ | 182 |
| 9 | 0 | $C_4H_9$ | $CH_3$ | $C_6H_5$ | 142 |
| 10 | 0 | $CH_2CH=CH_2$ | $CH_3$ | $C_6H_5$ | 168 |
| 11 | 0 | Cyclopropyl | $CH_3$ | $C_6H_5$ | 223 |
| 12 | 0 | Cyclohexyl | $CH_3$ | $C_6H_5$ | 162 |
| 13 | 0 | $CH_3$ | $CH_3$ | $o\text{-}FC_6H_4$ | 172 |
| 14 | 0 | $o\text{-}ClC_6H_4$ | $CH_3$ | $C_6H_5$ | 142 |
| 15 | 0 | $o\text{-}CH_3OC_6H_4$ | $CH_3$ | $C_6H_5$ | 120 |
| 16 | 0 | $p\text{-}CH_3OC_6H_4$ | $CH_3$ | $C_6H_5$ | 165 |
| 17 | 0 | $o\text{-}CH_3C_6H_4$ | $CH_3$ | $C_6H_5$ | 180 |
| 18 | 0 | $p\text{-}NO_2C_6H_4$ | $CH_3$ | $C_6H_5$ | 194 |
| 19 | 0 | $p\text{-}CH_3OC_6H_4$ | $CH_3$ | $o\text{-}FC_6H_4$ | 169 |
| 20 | 0 | $p\text{-}CH_3C_6H_4SO_2$ | $CH_3$ | $C_6H_5$ | 168 |

The administration of these novel compounds to rats results in an increased rate of learning by the animal coupled with a prolonged period of retention of the learned behavior. Thus, these compounds are useful in conditions such as impaired learning ability or impaired retention.

The behavioral effects resulting from the administration of these compounds to rats were evaluated on a modified Cook-Weidley apparatus (L. Cook and E. Weidley, Ann. N.Y. Acad. Sci., 66, 740 1957). Basically, the apparatus consists of a chamber with a grid flooring and an escape platform outside the chamber. The electric shock to the grid floor was controlled by a rheostat mechanism and scrambler. Rats were divided into two groups for each test trial. One group was administered saline as the control and the other group the test drug about ½ hour prior to electroconvulsive shock. It is known that electroconvulsive shock induces a state of proactive amnesia or an impaired learning rate (Deutsh, J.A., 1962, Ann. Rev. Psychol., 24, 259). Then, 15 minutes after electroconvulsive shock, the rats were given 10 acquisition trials on the jump out test to measure learning rates. Each acquisition trial consisted of 15 seconds in the chamber without any stimulation followed by 10 seconds of buzzer stimulation and culminated by 5 seconds of buzzer-plus-shock stimulation. The time from entrance into the apparatus until the rat jumps out is recorded as the escape time. Retention of the learned behavioral pattern was tested by repeating the test one hour after the last acquisition trial. The test sequence for each trial was terminated upon successful completion of the task, e.g., jumping out of the chamber.

EXAMPLE 21

The effect of N-[(3-methyl-4-oxo-5-phenyl-2-oxazolidinylidene)-carbamoyl]glycine ethyl ester on the acquisition and retention of a learned response in rats.

INTRAPERITONEAL ADMINISTRATION
[Controls; Test Cmpd. 20 mg./kg.]

| Trial: | Mean Escape Time Sec. | |
|---|---|---|
| 1 | 30.0±0.0 | 30.0±0.0 |
| 2 | 30.0±0.0 | 29.8±0.3 |
| 3 | 29.5±0.5 | 23.8±5.0 |
| 4 | 24.3±4.2 | 9.8±3.1 |
| 5 | 24.5±3.3 | 6.8±2.3 |
| 6 | 21.0±4.4 | 6.0±1.6 |
| 7 | 19.8±5.7 | 13.3±4.9 |
| 8 | 16.5±4.3 | 6.5±2.7 |
| 9 | 20.3±3.7 | 7.8±2.4 |
| 10 | 17.8±3.2 | 6.5±2.4 |

Retention Trial, 1 hour after last Acquisition Trial

| | 19.3±4.1 | 9.0±3.2 |
|---|---|---|

EXAMPLE 22

Effect of 1-cyclohexyl-3-(3-methyl-4-oxo-5-phenyl-2-oxazolidinylidene)urea on acquisition and retention of learned response in rats INTRAPERITONEAL ADMINISTRATION
[Controls; Test Cmpd. 20 mg./kg.]

| Trial: | Mean Escape Time Sec. | |
|---|---|---|
| 1 | 30.0±0.0 | 29.5±0.5 |
| 2 | 29.5±0.5 | 27.5±1.0 |
| 3 | 28.0±1.2 | 14.0±4.0 |
| 4 | 26.0±2.8 | 11.0±5.1 |
| 5 | 23.8±2.8 | 7.5±3.5 |
| 6 | 22.3±3.0 | 10.3±5.9 |
| 7 | 21.0±3.5 | 7.3±2.1 |
| 8 | 20.3±4.1 | 5.0±1.4 |
| 9 | 22.0±3.7 | 7.3±1.3 |
| 10 | 20.0±3.5 | 9.8±2.5 |

Retention Trial, 1 hour after last Acquisition Trial

| | 23.8±3.7 | 11.0±0.0 |
|---|---|---|

EXAMPLE 23

Effect of 1-(p-methoxyphenyl)-3-(3-methyl-4-oxo-5-phenyl-2-oxazolidinylidene)urea INTRAPERITONEAL ADMINISTRATION
[Controls; Test Cmpd. 20 mg./kg.]

| Trial: | Mean Escape Time Sec. | |
|---|---|---|
| 1 | 30.0±0.0 | 30.0±0.0 |
| 2 | 29.8±0.3 | 30.0±0.0 |
| 3 | 23.0±3.2 | 27.3±2.4 |
| 4 | 21.3±3.1 | 18.5±6.1 |
| 5 | 21.3±3.8 | 15.5±6.1 |
| 6 | 18.5±1.0 | 7.0±1.0 |
| 7 | 18.8±1.4 | 16.8±4.5 |
| 8 | 15.3±4.5 | 9.0±2.4 |
| 9 | 14.5±4.5 | 8.5±0.7 |
| 10 | 12.8±2.9 | 7.5±0.9 |

Retention Trial, 1 hour after last Acquisition Trial

| | 19.3±6.2 | 6.5±1.7 |
|---|---|---|

EXAMPLE 24

Effect of 1-ethyl-3-(3-methyl-4-oxo-5-phenyl-2-oxazolidinylidene)urea

INTRAPERITONEAL ADMINISTRATION

[Controls; Test Cmpd. 20 mg./kg.]

| Trial: | Mean Escape Time Sec. | |
| --- | --- | --- |
| 1 | 29.5±0.5 | 29.8±0.3 |
| 2 | 26.0±3.1 | 26.8±1.3 |
| 3 | 23.3±5.1 | 17.3±4.1 |
| 4 | 23.5±3.0 | 16.0±5.3 |
| 5 | 23.0±3.9 | 12.3±6.0 |
| 6 | 20.8±3.8 | 12.3±4.3 |
| 7 | 20.0±5.4 | 14.3±2.8 |
| 8 | 17.0±4.9 | 19.5±2.7 |
| 9 | 16.5±5.4 | 15.5±2.0 |
| 10 | 18.3±4.6 | 14.5±2.4 |

Retention Trial, 1 hour after last Acquisition Trial 21.5±5.1   10.3±1.9

EXAMPLE 25

Effect of 1-butyl-3-(3-methyl-4-oxo-5-phenyl-2-oxazolidinylidene)urea

INTRAPERITONEAL ADMINISTRATION

[Controls; Test Cmpd. 20 mg./kg.]

| Trial: | Mean Escape Time Sec. | |
| --- | --- | --- |
| 1 | 30.0±0.0 | 30.0±0.0 |
| 2 | 30.0±0.0 | 27.5±1.1 |
| 3 | 27.5±1.6 | 22.7±5.0 |
| 4 | 18.2±5.4 | 18.0±5.6 |
| 5 | 18.7±5.2 | 10.0±5.1 |
| 6 | 19.0±5.9 | 11.0±5.5 |
| 7 | 16.2±7.1 | 10.2±2.7 |
| 8 | 12.2±6.0 | 8.7±2.2 |
| 9 | 11.0±6.3 | 6.7±2.4 |
| 10 | 11.0±6.3 | 11.2±2.4 |

Retention Trial, 1 hour after last Acquisition Trial 17.0±5.7   14.2±5.3

From the foregoing examples, it is clearly illustrated that these compounds have a marked effect on increasing the rate of learning of a given behavioral pattern. In all trials, the rats which were administered the test compound showed a marked increase in the learning rate by the third or fourth acquisition trial. Furthermore, the retention trials illustrated that these compounds prolong the period of the learned behavior since the rats so treated performed more efficiently on the jump out test one hour after the last acquisition trial.

In all cases, the compounds were administered intraperitoneally at a dosage level of 20 mg./kg. of body weight of the rats. However, other routes of administration may similarly be employed.

I claim:

1. A chemical compound of the formula

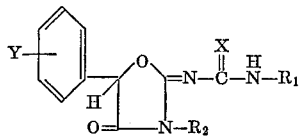

wherein X is a member selected from the group consisting of oxygen and sulfur; $R_1$ is a member selected from the group consisting of hydrogen, alkyl and alkenyl up to 4 carbon atoms, cyclo alkyl up to 6 carbon atoms, phenyl, tolyl, halophenyl, anisyl, nitrophenyl, tolyl sulfonyl, and alkoxycarbonyl methylene up to a total of 4 carbon atoms; and $R_2$ is a member selected from the group consisting of hydrogen and alkyl to 4 carbon atoms; and Y is a member selected from the group consisting of hydrogen and fluorine.

2. A compound according to claim 1 wherein X is oxygen, $R_1$ and $R_2$ are methyl and Y is hydrogen.

3. A compound according to claim 1 wherein X is oxygen, $R_1$ is phenyl, $R_2$ is methyl and Y is hydrogen.

4. A compound according to claim 1 wherein X is oxygen, $R_1$ is hydrogen, $R_2$ is methyl and Y is hydrogen.

5. A compound according to claim 1 wherein X is oxygen, $R_1$ is methyl, $R_2$ is hydrogen and Y is hydrogen.

6. A compound according to claim 1 wherein X is sulfur, $R_1$ is ethyl, $R_2$ is methyl and Y is hydrogen.

7. A compound according to claim 1 wherein X is oxygen, $R_1$ is ethoxycarbonylmethyl, $R_2$ is methyl and Y is hydrogen.

8. A compound according to claim 1 wherein X is oxygen, $R_1$ is p-methoxyphenyl, $R_2$ is methyl and Y is hydrogen.

9. A compound according to claim 1 wherein X is oxygen, $R_1$ is ethyl, $R_2$ is methyl and Y is hydrogen.

10. A compound according to claim 1 wherein X is oxygen, $R_1$ is cyclohexyl, $R_2$ is methyl and Y is hydrogen.

11. A compound according to claim 1 wherein X is oxygen, $R_1$ is n-butyl, $R_2$ is methyl and Y is hydrogen.

12. A compound according to claim 1 wherein X is oxygen, $R_1$ is o-methoxyphenyl, $R_2$ is methyl and Y is hydrogen.

13. A compound according to claim 1 wherein X is oxygen, $R_1$ is p-nitrophenyl, $R_2$ is methyl and Y is hydrogen.

14. A compound according to claim 1 wherein X is oxygen, $R_1$ is methyl, $R_2$ is methyl and Y is o-fluoro.

15. A compound according to claim 1 wherein X is oxygen, $R_1$ is p-methoxyphenyl, $R_2$ is methyl and Y is o-fluoro.

References Cited

C. A. 62, 10425h (1965). Only the abstract is cited.

ALEX MAZEL, Primary Examiner

R. V. RUSH, Assistant Examiner

U.S. Cl. X.R.

424—272